United States Patent
Andonian et al.

(10) Patent No.: US 12,430,876 B1
(45) Date of Patent: Sep. 30, 2025

(54) TRAINING AN ARTIFICIAL INTELLIGENCE MODEL BASED ON SOFT INFORMATION

(71) Applicant: Amazon Technologies, Inc., Seattle, WA (US)

(72) Inventors: Alexander Andonian, Lincoln, MA (US); Shixing Chen, Kirkland, WA (US); Muhammad Raffay Hamid, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 678 days.

(21) Appl. No.: 17/669,590

(22) Filed: Feb. 11, 2022

(51) Int. Cl.
G06V 10/75 (2022.01)
G06N 20/20 (2019.01)

(52) U.S. Cl.
CPC ........... G06V 10/75 (2022.01); G06N 20/20 (2019.01)

(58) Field of Classification Search
None
See application file for complete search history.

(56) References Cited

U.S. PATENT DOCUMENTS

| | | | | |
|---|---|---|---|---|
| 8,755,595 B1* | 6/2014 | Bissacco | ............... | G06F 18/214 |
| | | | | 382/159 |
| 10,997,463 B2* | 5/2021 | Wang | ............... | G06V 20/62 |
| 2022/0076078 A1* | 3/2022 | Vdovjak | ............... | G06N 3/08 |
| 2023/0019211 A1* | 1/2023 | Wang | ............... | G06V 10/811 |

FOREIGN PATENT DOCUMENTS

| | | | | |
|---|---|---|---|---|
| CN | 110781960 | * | 2/2020 | ............. G06F 16/75 |
| CN | 113901907 | * | 1/2022 | ............. G06K 9/00 |

\* cited by examiner

*Primary Examiner* — Beniyam Menberu
(74) *Attorney, Agent, or Firm* — Kilpatrick Townsend & Stockton LLP

(57) ABSTRACT

Soft information can be used to train an artificial intelligence (AI) model. For example, a computer system determines first training data that includes a first image, first text, a second image, second text, a first indication of a first correspondence between the first image and the first text, and a second indication of a second correspondence between the second image and the second text. The computer system determines a likelihood of the first image and the second text corresponding to each other. The computer system generates second training data that includes the first image, the first text, the second image, the second text, the likelihood instead of the first indication, and the second indication. The computer system trains an AI model based at least in part on the second training data.

20 Claims, 11 Drawing Sheets

US 12,430,876 B1

TRAINING AN ARTIFICIAL INTELLIGENCE MODEL BASED ON SOFT INFORMATION

BACKGROUND

Artificial intelligence (AI) models can be trained to perform various image-processing tasks. For example, an AI model may segment portions of an image, apply filters to an image, or identifying objects or entities in an image. In some instances, an AI model may be trained to provide a textual description of an image.

BRIEF DESCRIPTION OF THE DRAWINGS

Various embodiments in accordance with the present disclosure will be described with reference to the drawings, in which.

DETAILED DESCRIPTION

Figure 1:
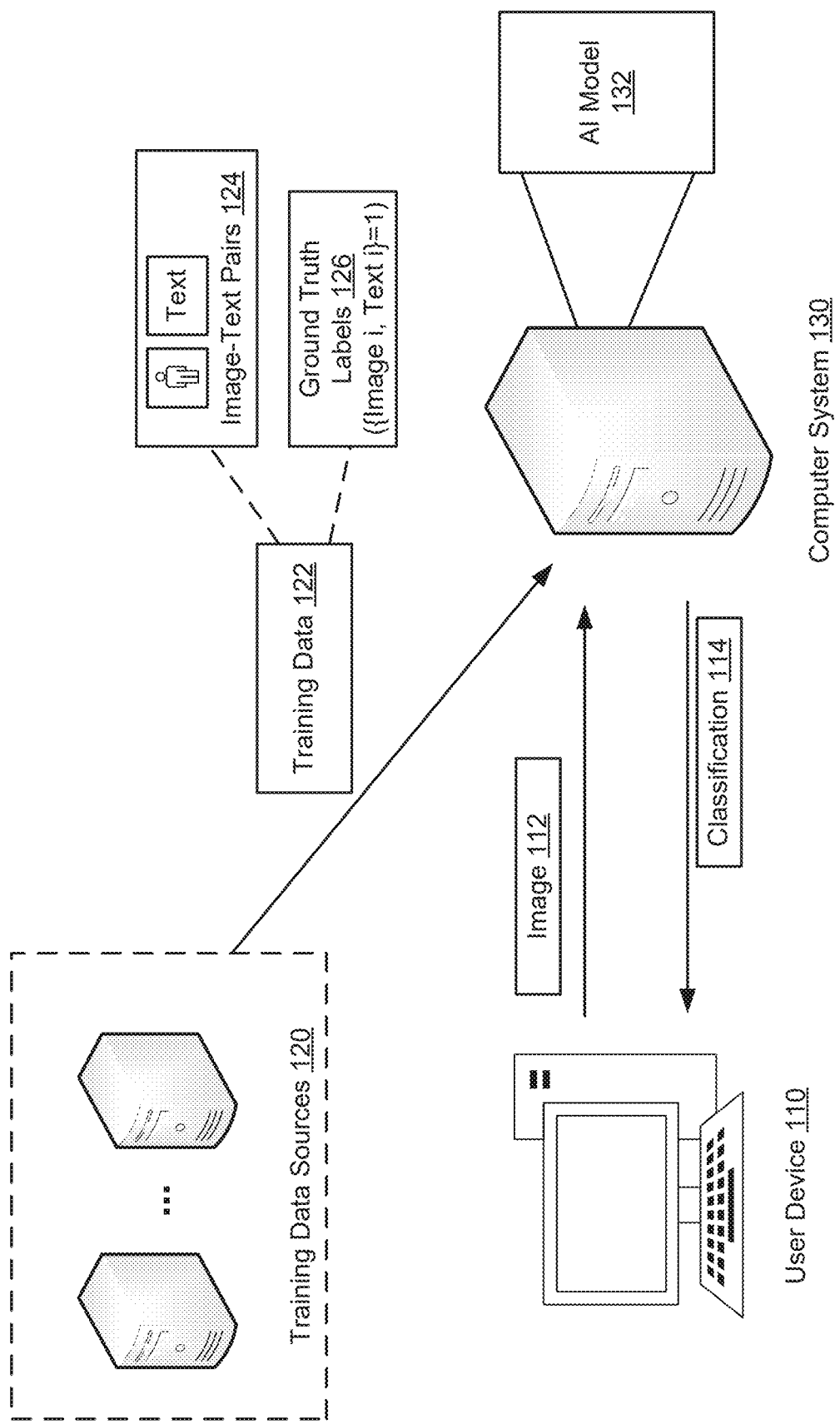
FIG. 1 illustrates an example of a system for determining image classifications based on an AI model, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, training an artificial intelligence (AI) model based on soft information. Soft information refers to information that is associated with non-binary values (e.g., a percentage or a value between "0" and "1" rather than a "0" or a "1" only). In an example, a computer system receives first training data that includes image-text pairs and ground truth labels associated with the image-text pairs. Each image-text pair includes an image that shows an object and a text that describes the object. The ground truth label associated with an image-text pair indicates a correspondence between the image and the object. The computer system trains a first AI model based on the first training data. The ground truth labels can take the form of binary values, and can therefore represent hard information. The first AI model is trained to generate pseudo-ground truth labels for the image-text pairs. A pseudo-ground truth label generated for the image-text pair indicates a likelihood of the correspondence between the image and the object. The pseudo-ground truth labels can have non-binary values, and therefore represent soft information. The computer system generates second training data based on the image-text pairs, the ground truth labels, and the pseudo-ground truth labels. The second training data includes a first subset of the image-text pairs and a first subset of the ground truth labels that are associated with the first subset of the image-text pairs. The second training data further includes a second subset of the image-text pairs and a second subset of the pseudo-ground truth labels that are associated with the second subset of the image-text pairs. The sizes of the two subsets can progressively change based on the training iteration (e.g., the size of the first subset can decrease, whereas the size of the second subset can increase as the training progresses). Thus, the second training data includes a combination of hard information and soft information. The computer system trains a second AI model based on the second training data. The second AI model can be the same as the first AI model, in which case training the second AI model corresponds to refining the first AI model. The computer system generates, upon completion of the training of the second AI model, a classification of an image by at least inputting the image to the second AI model.

To illustrate, consider a system that processes images to provide classifications for the images. Training data including corresponding and non-corresponding image-text pairs can be collected from multiple sources (e.g., from online web sites) and received by a computer system. The corresponding image-text pairs can have a ground truth label of one and the non-corresponding image-text pairs can have a ground truth label of zero. The computer system can then train an AI model using the training data. The AI model can generate distilled training data by generating pseudo-ground truth labels for the image-text pairs of the training data. The pseudo-ground truth labels can indicate a percentage likelihood that the image corresponds to the text. Some image-text pairs and ground truth labels and some image-text pairs and pseudo-ground truth labels can be selected to be included in final training data. The computer system can then train the AI model, or a different AI model, to classify images using the final training data.

Embodiments of the present disclosure may provide technical improvements over conventional techniques for training an AI model to classify images. For example, training conventional AI models is typically compute and data inefficient, since large amounts of training data is needed to properly train the AI models. Hard information is typically used, which corresponds each image to a single text, even when additional texts share a correspondence to the image. However, this training data can be noisy (e.g., includes incorrect ground truth-labels). The process of the present disclosure uses soft information to learn from noisy data and model many-to-many relationships. Over the course of training, the network generates soft alignments for increasingly large subsets of a dataset, effectively becoming its own teacher. In addition, the method provides improved effective robustness to natural distribution shifts compared to conventional methods. By doing so, the performance of the trained AI model is improved, whereby this model may more accurately classify images, recognize objects in the images, or generate descriptions of images for example.

FIG. 1 illustrates an example of a system for determining image classifications based on an AI model, according to an embodiment of the present disclosure. A computer system 130 can include an AI model 132 trained to receive an image 112 from a user device 110 and generate a classification 114 of the image 112. The classification 114 is described herein as one example use case. Other use cases are possible, such as detecting one or more objects in the image 112 and/or generating a textual description of the image 112. Prior to receiving the image 112, the AI model 132 can be trained using training data 122 from training data sources 120, which can include online sources (e.g., web sites, where the training data 122 corresponds to images and annotations thereof from web pages and/or web articles). The training data 122 includes image-text pairs 124 and ground truth labels 126. The images of the image-text pairs 124 can show objects and the text can describe the objects. In an example, text describing an image can include multiple words that form one or more sentences describing a portion of the image or the entire image. For instance, the text associated with an image of an airplane may be "an airplane flying through a cloudy sky." The ground truth labels 126 can be binary values indicating the correspondence between the image and the text of the image-text pairs 124. For example, a ground truth label having a value of one can represent an image-text pair in which the image and the text correspond (e.g., an image of a dog and text indicating the image includes a dog), and a ground truth label having a value of zero can represent an image-text pair in which the image and the text do not correspond (e.g., an image of a dog and text indicating the image includes a person).

Since the ground truth labels 126 are binary values, some of the ground truth labels 126 may not be accurate, leading to reduced accuracy of classification once the AI model 132 is trained. Therefore, it may be desirable to train the AI model 132 in such a way to improve the accuracy of the classifications. The training can involve a progressive self-distillation approach, which is further described below.

Figure 2:
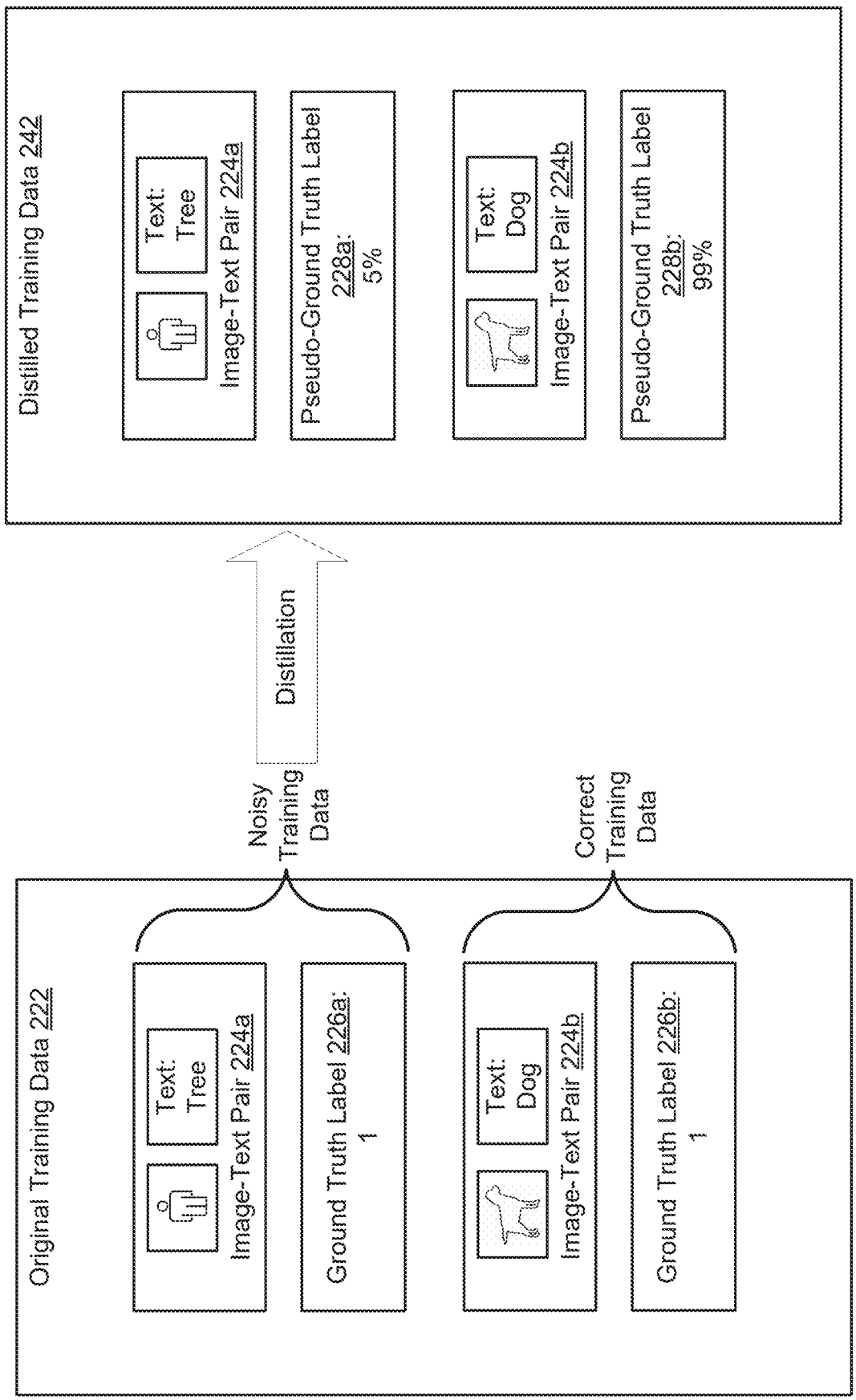
FIG. 2 illustrates an example of original training data and distilled training data, according to an embodiment of the present disclosure.

FIG. 2 illustrates an example of original training data 222 and distilled training data 242, according to an embodiment of the present disclosure. The original training data 222 can correspond to the training data 122 in FIG. 1 of image-text pairs and ground truth labels. A first image-text pair 224a can include an image of a person and text about a tree. A ground truth label 226a for the image-text pair 224a can be one, indicating that the image of the image text-pair 224a and the text of the image-text pair 224a correspond. But, since the image is a person and the text is about a tree the image-text pair 224a and the ground truth label 226a can be considered to be noisy training data. The original training data 222 also includes a second image-text pair 224b including an image of a dog and text about a dog. A ground truth label 226b for the image-text pair 224b can be one, indicating that the image of the image-text pair 224b and the text of the image-text pair 224b correspond. Since the image is a dog and the text is about a dog the image-text pair 224b and the ground truth label 226b can be considered to be correct training data. Of course, these are two examples of image-text pairs and their ground truth labels. Other examples are likewise possible.

Distillation can be performed to generate distilled training data 242 based on the original training data 222. The ground truth labels for the distilled training data 242 can be non-binary values indicating a prediction of correspondence between images and texts of image-text pairs. Based on the distillation, a pseudo-ground truth label 228a can be generated for the first image-text pair 224a that includes the image of a person and text about a tree. The pseudo-ground truth label 228a can be 5%, indicating that the image and the text of the image-text pair 224a have a low likelihood of correspondence. The distilled training data 242 also includes the second image-text pair 224b including the image of a dog and text about a dog. A pseudo-ground truth label 228b for the image-text pair 224b can be 99%, indicating that the image and the text of the image-text pair 224b have a high likelihood of correspondence. A combination of the original training data 222 and the distilled training data 242 can be used to train an AI model (e.g., AI model 132 in FIG. 1) for classifying images or text (or for other use cases, such as object detection, text generation, and the like).

Figure 3:
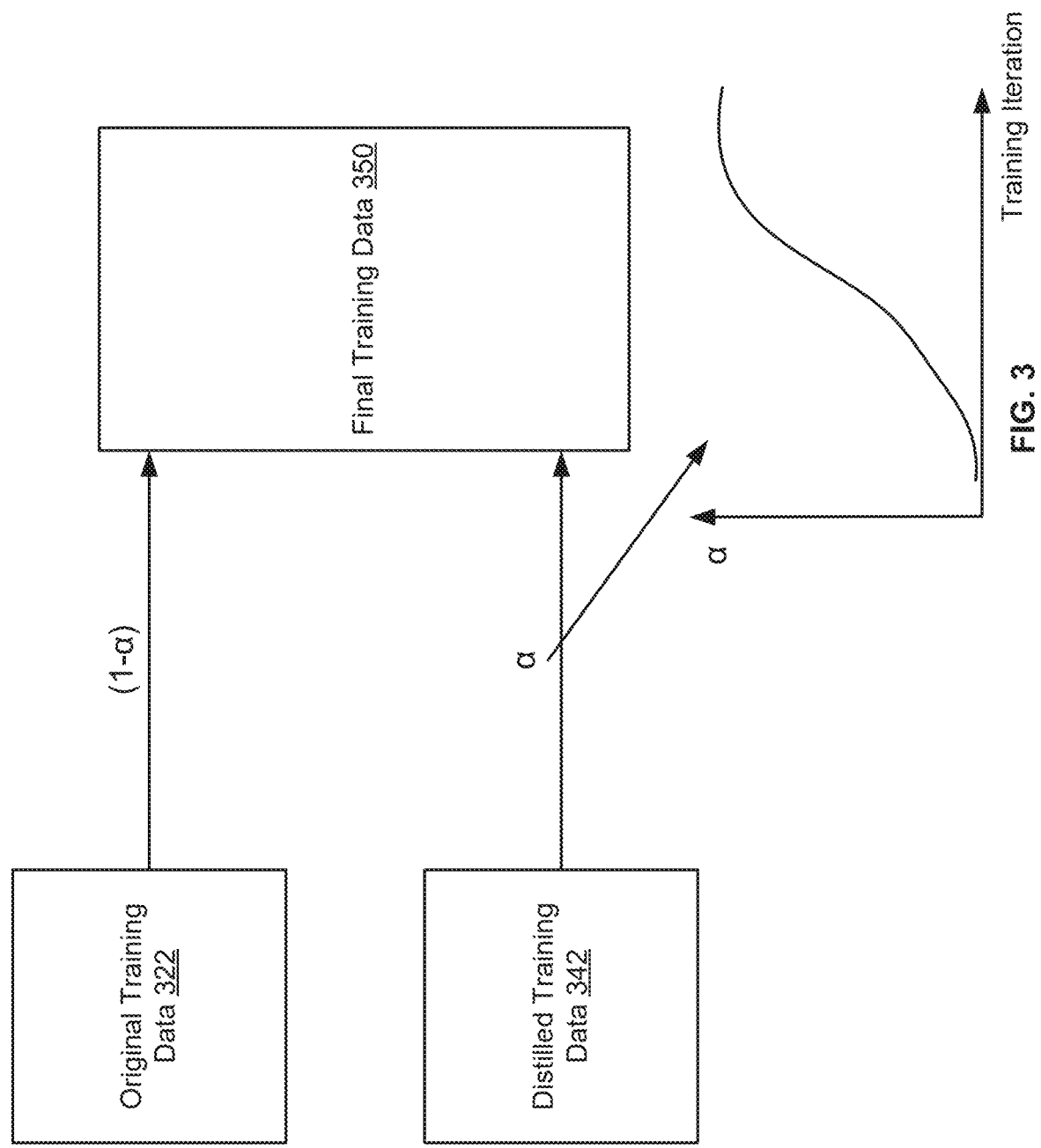
FIG. 3 illustrates an example of final training data generated from original training data and distilled training data, according to an embodiment of the present disclosure.

FIG. 3 illustrates an example of final training data 350 generated from original training data 322 and distilled training data 342, according to an embodiment of the present disclosure. The original training data 322 corresponds to the original training data 222 in FIG. 2 and the distilled training data 342 corresponds to the distilled training data 242 in FIG. 2. An AI model for classifying text and images can be trained in multiple training iterations, each with a different ratio of ground truth labels of the original training data 322 and pseudo-ground truth labels of the distilled training data 342. The training iterations may also be referred to as decoding iterations.

In an example, a first ratio of ground truth labels and pseudo-ground truth labels can be determined to be used in a first training iteration. The percentage of the pseudo-ground truth labels of the distilled training data 342 used in the final training data 350 can be represented by a, and the percentage of ground truth labels of the original training data 322 used in the final training data 350 can be represented by $1-\alpha$. The ratio may be based on a predefined function, such as a sigmoid function, as shown in FIG. 3, or may be learned during the training. For a second training iteration that is subsequent to the first training iteration, an updated number of ground truth labels and an updated number of pseudo-ground truth labels can be used for the final training data 350. Using the sigmoid function, the updated number of ground truth labels can be a decrease to the number of ground truth labels and the updated number of pseudo-ground truth labels can be an increase to the number of pseudo-ground truth labels in the final training data 350. A ratio is one example of defining the $\alpha$ parameter usable to progressively vary the sizes of the training data subsets to use. Of course other example definitions are possible (e.g., a first target number of ground truth labels and a second target number of pseudo-ground truth labels, rather than the ratio of these two numbers).

Figure 4:
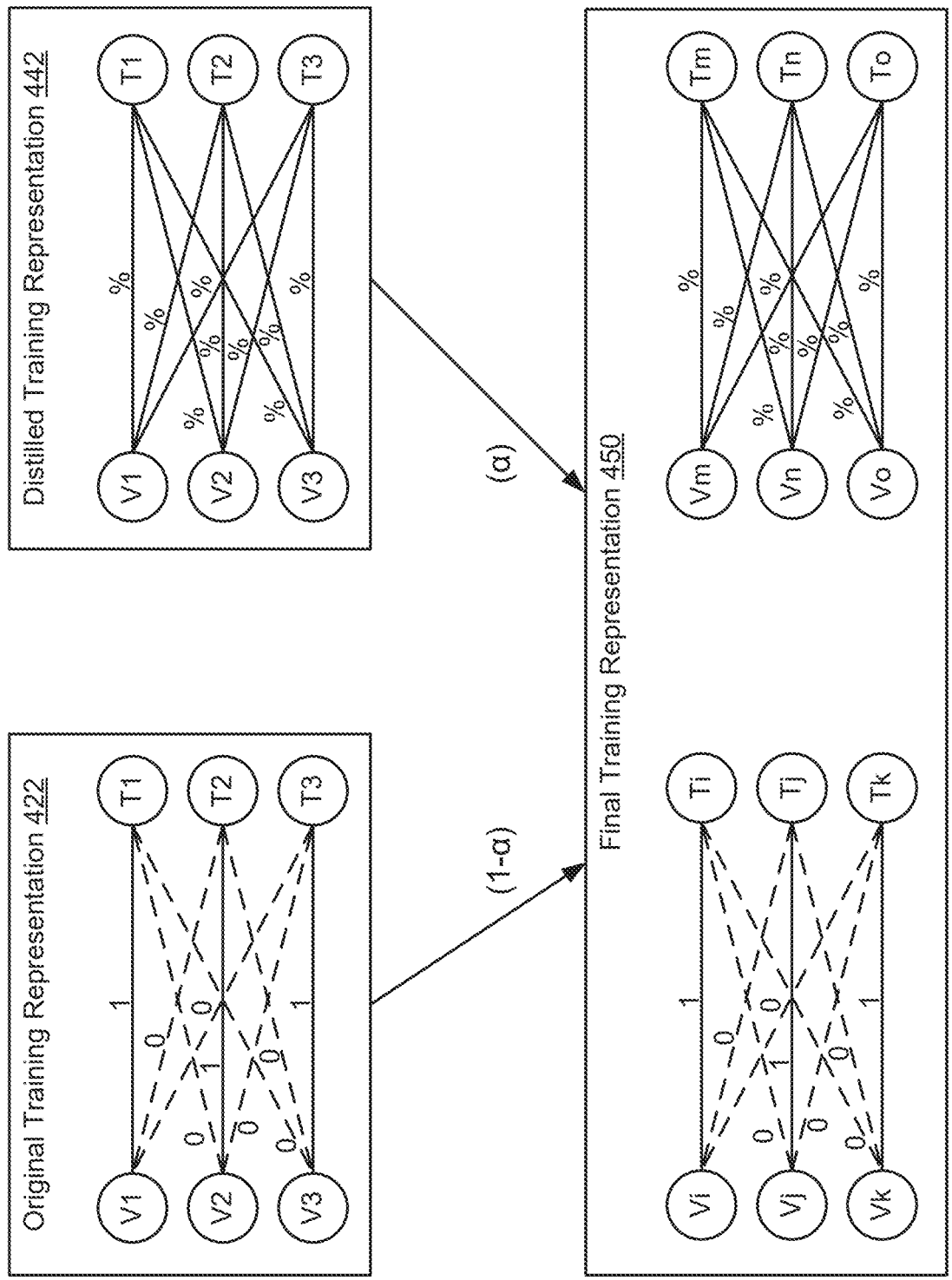
FIG. 4 illustrates an example of a final training representation generated from original training representation and a distilled training representation, according to an embodiment of the present disclosure.

FIG. 4 illustrates an example of a final training representation 450 generated from original training representation 422 and a distilled training representation 442, according to an embodiment of the present disclosure. The original training representation 422 includes three image-text pairs. Each of the image-text pairs of the original training representation 422 has a ground truth label of hard information, meaning the ground truth label is a binary value. As illustrated, V1 corresponds to T1, V2 corresponds to T2, and V3 corresponds to V3, since the ground truth label for each image-text pair is one. The other image-text pairs are shown to have a ground truth label of zero, indicating that the images and texts do not correspond to each other (e.g., for the V1–T2 image pair, the ground truth label is zero, indicating that T2 does not correspond to V1 and vice versa). The distilled training representation 442 also includes three image-text pairs, but the pseudo-ground truth labels are soft information, meaning the pseudo-ground truth labels are non-binary values. The non-binary values allow each combination of the images and texts have a pseudo-ground truth label representing the likelihood that the image corresponds to the text.

The bottom portion of FIG. 4 assumes more than three images and more than three texts by showing Vi, Vj, Vk, Vm, Vn, Vo images and Ti, Tj, Tk, Tm, Tn, and To texts. In this case, a number of the image-to-text representations of the original training representation 422 and another number of the image-to-text representations of the distilled training representation, determined based on a, are included in the final training representation 450. The ground truth labels for the image-to-text pairs of the original training representation 422 and the pseudo-ground truth labels of the image-text pairs of the distilled training representation 442 are maintained in the final training representation 450. The final training representation 450 is used to train an AI model to generate classifications of images.

Figure 5:
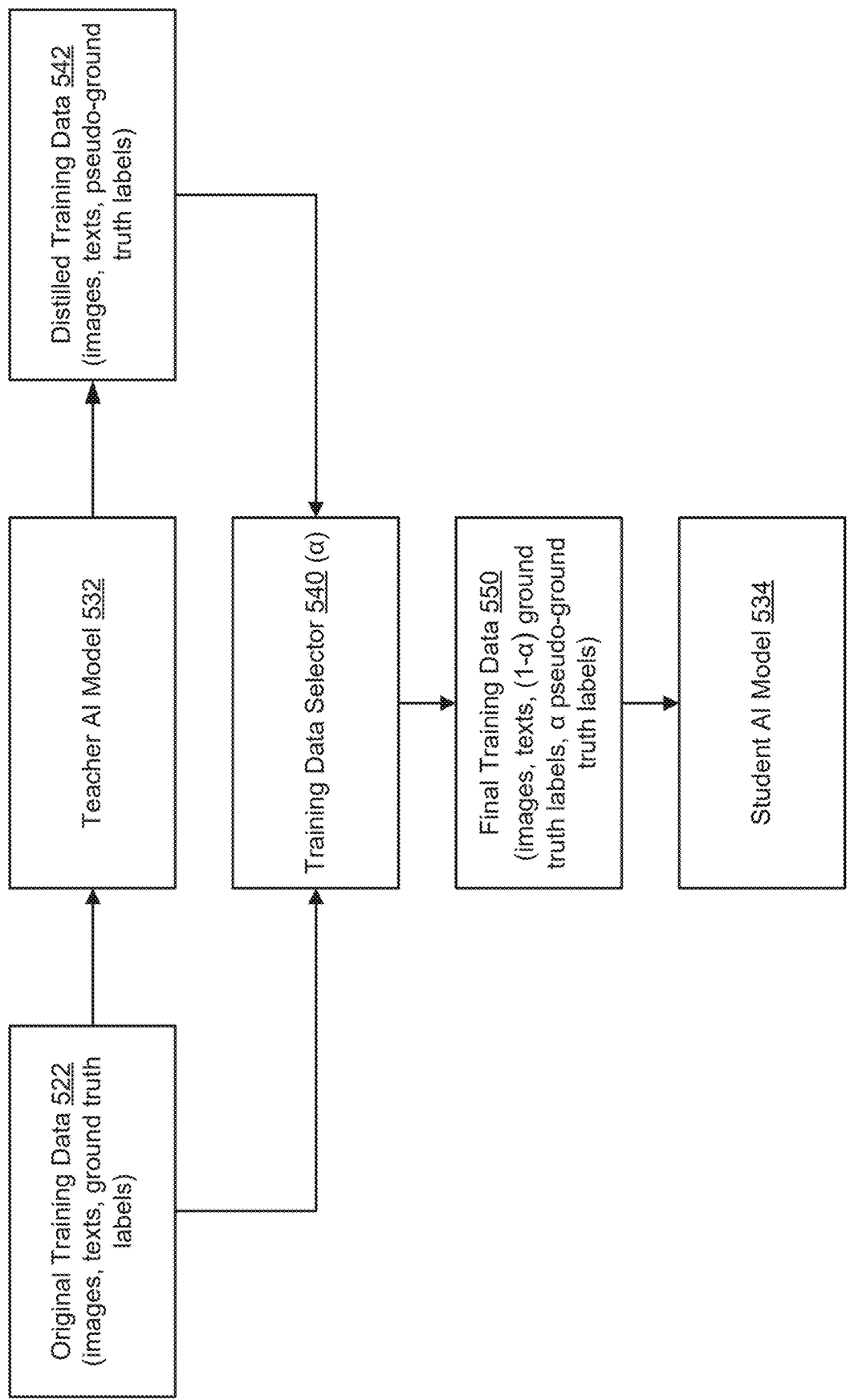
FIG. 5 illustrates an example of a flow of training two AI models to generate likelihoods and image classifications, according to an embodiment of the present disclosure.

FIG. 5 illustrates an example of a flow of training two AI models to generate likelihoods and image classifications, according to an embodiment of the present disclosure. A teacher AI model 532 can receive original training data 522 that includes images, texts, and ground truth labels. The teacher AI model 532 is trained using the original training data 522 to determine soft information, such as to output a likelihood of a correspondence between an image and a text. As such, the teacher AI model 532 can be used to generate distilled training data 542 that includes images, texts, and pseudo-ground truth labels. The original training data 522 and the distilled training data 542 can be used then to train a student AI model 534.

A training data selector 540 can also receive the original training data 522 and the distilled training data 542. Based on a predefined function (e.g., a sigmoid function), or a learned function (e.g., one modeled that varies the value of a, where the value by which a is to be varied at each training iteration is learned during the training itself), the training data selector 540 can determine a ratio of the original training data 522 and the distilled training data 542 for making up final training data 550. The final training data 550, which includes images, texts, (1−α) ground truth labels, and α pseudo-ground truth labels, is used at a second time to train the student AI model 534 to generate classifications of images (or for other use cases as explained herein above). The teacher AI model 532 and the student AI model 534 can be a same contrastive model in which a same loss function is used in training the teacher AI model 532 and the student AI model 534.

Figure 6:
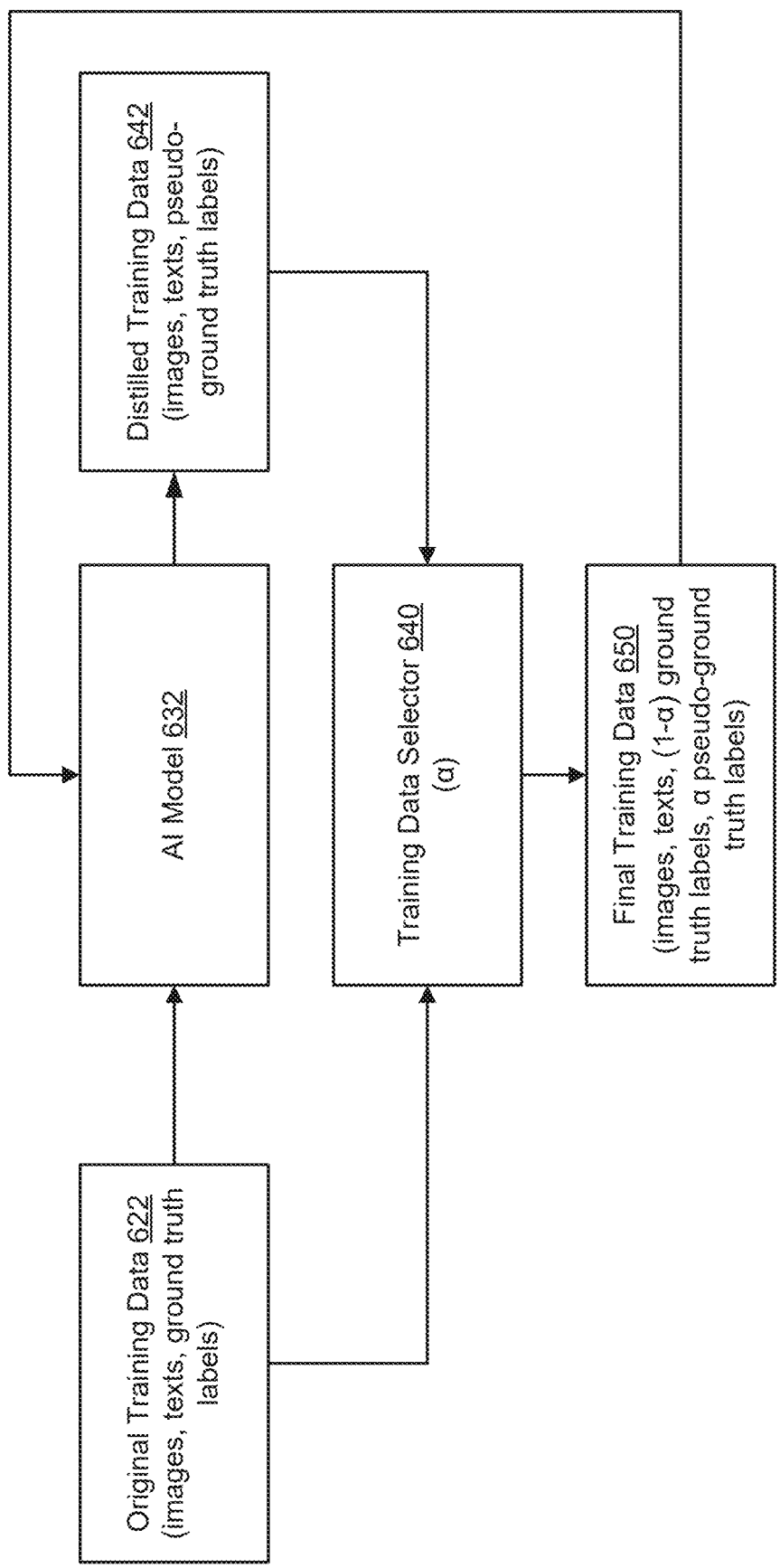
FIG. 6 illustrates an example of a flow for training an AI model to generate likelihoods and image classifications, according to an embodiment of the present disclosure.

FIG. 6 illustrates an example of a flow for training an AI model 632 to generate likelihoods and image classifications, according to an embodiment of the present disclosure. Whereas in FIG. 5, two different AI models are trained, here the same AI model is trained first using ground truth labels and second using a combination of ground truth labels and pseudo-ground truth labels. The AI model 632 can receive original training data 622 that includes images, texts, and ground truth labels. The AI model 632 is trained using the original training data 622 to determine soft information, such as to output a likelihood of a correspondence between an image and a text. As such, the AI model 632 can be used to generate distilled training data 642 that includes images, texts, and pseudo-ground truth labels. The original training data 622 and the distilled training data 642 can be used then to further train the AI model 632.

A training data selector 640 can also receive the original training data 622 and the distilled training data 642. Based on a predefined function, or a learned function, the training data selector 640 can determine a ratio of the original training data 622 and the distilled training data 642 for making up final training data 650. The final training data 650, which includes images, texts, (1−α) ground truth labels, and a pseudo-ground truth labels, is used at a second time to train the AI model 632 to generate classifications of images (or for other use cases as explained herein above). The AI model 632 can be trained using a loss function that includes a loss function associated with learning text-to-image representations and a second loss function associated with learning the image-to-text representations.

Figure 7:
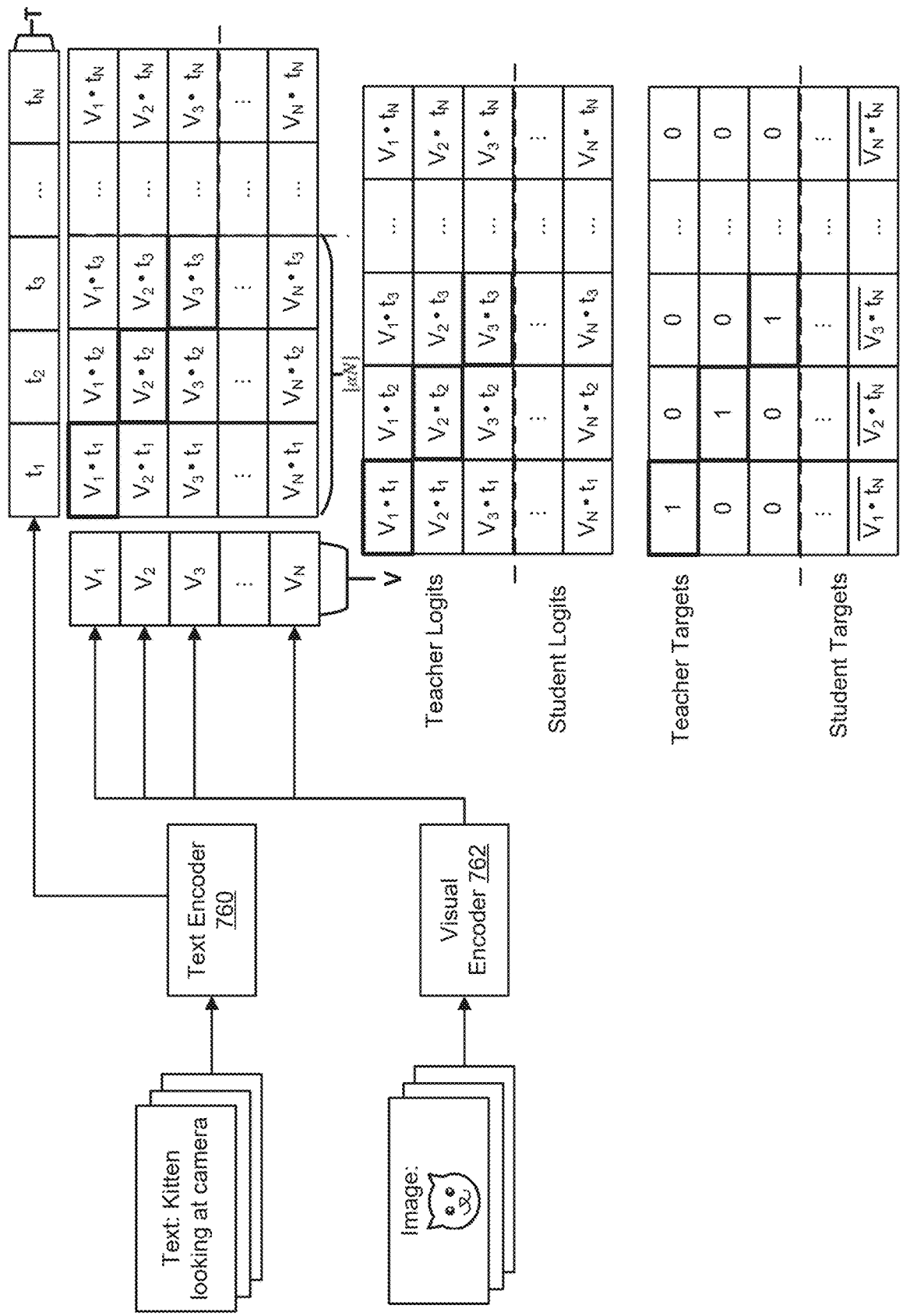
FIG. 7 illustrates an example of a distillation and progressive training approach for an AI model, according to an embodiment of the present disclosure.

FIG. 7 illustrates an example of a distillation and progressive training approach for an AI model, according to an embodiment of the present disclosure. In general, the problem of learning aligned visual-language representations from web-scale weakly annotated data is associated with the challenge of learning many-to-many relationships from noisy image-text correspondences. To address this challenge, a vision-language pre-training method can be used that progressively distills a model's own knowledge to soften its initially hard target-alignments, thereby enabling the model to learn more transferable representations from the same amount of training data.

In an example, a batch of N semantically paired image-text tuples $\{(v_i, t_i)\}_{i=1:N}$ are drawn from a cross-modal dataset. The goal of cross-model contrastive pre-training is to learn encoders $f_v$ for image data and $f_t$ for text data such that for a given semantically related instance $(v_i, t_i)$, the encoded l2-normalized embeddings $v_i = f_v(v_i)$ and $t_i = f_t(t_i)$ with $v_i, t_i \in \mathbb{R}^d$ close together (i.e., "aligned") under some distance metric, while the unpaired image and text embeddings are farther apart (i.e., "unaligned").

The visual encoder 762 and the text encoder 760 can be trained with a contrastive loss by minimizing the loss $\mathcal{L}_{infoNCE} = \mathcal{L}_v + L_t$, where $\mathcal{L}_v$ is the loss for aligning images to text and $L_t$ is the loss for aligning text to images. Specifically, $\mathcal{L}_v$ can be defined as:

$$\mathcal{L}_v = -\frac{1}{N} \sum_{i=1}^{N} \sum_{j=1}^{N} = I_{ij} \log P_v(v_i, t_j; \tau) \qquad (1)$$

$$P_v(v_i, t_j; \tau) = \frac{\exp(\text{sim}(v_i, t_j)/\tau)}{\sum_{k=1}^{N} \exp(\text{sim}(v_i t_j)/\tau)} \qquad (2)$$

where $\text{sim}(v_i, t_j) = v_i^T t_j$ is typically chosen to be the dot product (cosine similarity), $\tau$ is a learnable softmax temperature parameter and $I_{ij}$ is an element from the identity matrix $I_N$. Since InfoNCE is symmetric, $L_t$ and $P_t$ are defined in a similar manner.

For convenience, let V, T $\in \mathbb{R}^{N \times d}$ be matrices that contain a batch of image and text embeddings whose rows are populated with v1:N and t1:N, respectively. Then, the loss can be re-written compactly in matrix form as:

$$\mathcal{L}_{infoNCE} = \mathcal{H}_{(I_N, p(VT^T))} + \mathcal{H}_{(I_N, p(TV^T))} \qquad (3)$$

where $\mathcal{H}$ is the batched (row-wise) cross-entropy function with mean reduction and p is the standard softmax function applied row-wise such that each row sums to one.

Equation 3 shows that the loss is simply the cross entropy between a one-hot distribution $I_{ij}$ and estimated probability $P_v(v_i, t_j; \tau)$. It enforces the strict assumption that an image $v_i$ selected from a batch should be paired exclusively with text $t_i$ while being repelled from all other $t_j$.

But, this assumption generally does not hold for multiple reasons. First, it is likely that a given image would be aligned to several text captions to different degrees especially under large batch-size settings. Second, the ground truth pairings in large-scale weakly-annotated datasets may be simply incorrect or describe loose correlations between images and their corresponding texts.

To address the aforementioned limitations of using the loss to train on noisy cross-modal data, a knowledge distillation framework can be adopted, where the predictive probabilities produced by a teacher network are used as soft target distributions to train a student network.

The framework offers multiple advantages. First, in the process of generating target image-text alignments, a well-trained teacher can combat poorly captioned images by re-pairing them with stronger semantic matches from the batch, thereby providing a cleaner learning signal for the student network. Second, by providing soft targets, the teacher network can convey many-to-many relationships in a batch.

Specifically, to estimate the correspondence between image $v_i$ and text $t_j$, the teacher model employs visual encoder 762 ($\tilde{f}_v$) and text encoder 760 ($\tilde{f}_t$) to compute l2-normalized teacher embeddings $\tilde{v}_i$ and $\tilde{t}_j$ which are similarly batched as rows in the matrices $\tilde{V}$ and $\tilde{T}$ respectively. The method uses a swapped prediction strategy to produce soft target distributions $A^v$ and $A^t$ to supervise student training. These target distributions are defined as:

$$A^v = p(\tilde{T}\tilde{V}^T; \tilde{\tau}) \text{ and } A^t = p(\tilde{V}\tilde{T}^T; \tilde{\tau}) \quad (4)$$

where p is the standard softmax function using a secondary teacher temperature $\tilde{\tau}$ that transforms and re-scales raw logits into probabilities.

Swapped prediction improves on the established forward bootstrapping approach by using predictions from an opposite modality. Unlike bootstrapping, swapped prediction computes the image alignment scores $A^v$ from the text encoder posterior probabilities and vice-versa, thus aggregating information over all other instances from the opposite modality. Intuitively, the strength of alignment from image $v_i$ to text $t_j$ is based on the probability that text $t_j$ should be matched with image $v_i$ compared to all other $v_j$.

Replacing the IN targets in Equation 3 with estimated soft-alignment probabilities $A^v$ and $A^t$ allows the teacher model to re-calibrate the attractive and repulsive forces between image and text embeddings in the representation space based on its estimated similarity between instances. For instance, a faulty negative pair $(v_i, t_j)$, which may have high semantic similarity is assigned a similarity score of zero by the loss, whereas this method provides $A_{ij}$ as a target which should be larger given a well-trained teacher model.

Conventional knowledge distillation and semi-supervised learning methods offer numerous potential teacher choices (e.g., larger but static pre-trained teacher networks, networks that share the same model architecture but use weights from a previous epoch, or as an exponential moving average). The primary drawback to these approaches is reduced computational and memory efficiency as they require a secondary inference stage using additional model weights that are kept in memory.

To circumvent these issues, a self-distillation strategy can be used where the student network acts as its own teacher (i.e., $f_v = \tilde{f}_v$; $f_t = \tilde{f}_t$). The targets of the student contrastive objective can be updated using the current state of the model. Intuitively, as the learning improves over time, its representation can be trusted to make more accurate predictions. This mitigates the negative effects of noisy pairings as incorrect pairs are increasingly likely to be inconsistent with the consensus learned from the rest of the data as training progresses. By refining inconsistent alignments, the model can develop more coherent representations, which further improves its ability to evaluate the consistency of noisy image-text pairs.

As the objective relies on some basic level of alignment between corresponding image and text representations, the contribution of self-distillation to the contrastive learning process can be progressively increased over the course of training. The model therefore dynamically evolves into its own teacher as training progresses, which differs from the standard knowledge distillation setting where the teacher is often static and separate.

The dynamic progression can be achieved by randomly partitioning a batch of N image-text pairs into $N^a = \lfloor \alpha N \rfloor$ "aligned" instances and $N^u = N - \lfloor \alpha N \rfloor$ "unaligned" instances where $\alpha \in [0, 1]$ determines their relative proportions. The aligned subset is used to train the teacher network using the hard ground truth pairings and the standard loss. The teacher network then employs the aforementioned swapped prediction strategy to estimate soft alignments on the unaligned instances to supervise the student. This random minibatch partitioning can be referred to as dynamic as opposed to static, as the global partitioning of instances into aligned and unaligned subsets is refreshed for each training epoch.

To increase the strength of the teacher's influence on learning, the value of $\alpha$ can be decreased gradually, in the same way that the learning rate can be scheduled. There are several strategies to decrease $\alpha$ as a function of the training iteration. For example, step-wise, linear, or a cosine annealing schedule can be specified by a start and end value.

To summarize the overall training procedure, the batched student-teacher embedding is first computed with $V = \tilde{V}$ and $T = \tilde{T}$. Next, the first $N^a$ rows are extracted to form aligned subset of teacher embeddings $\tilde{V}^a$, $\tilde{T}^a$, and the last $N^u$ rows for the unaligned student embeddings $V^u$, $T^u$. Altogether, the final objective function is defined as:

$$\mathcal{L}_{infoNCE}^{PSD} = \alpha [\mathcal{H}_{(I_{Na}, p(\tilde{V}^a \tilde{T}^{aT}))} + \mathcal{H}_{(I_{Na}, p(\tilde{T}_a \tilde{V}^{aT}))}] + (1-\alpha) [\mathcal{H}_{(A^v, p(V^u T^T))} + \mathcal{H}_{(A^t, p(T^u V^T))}] \quad (5)$$

where $I_{Na} \in \mathbb{R}^{N_a \times N}$ is the zero-padded identity matric, while $A^v$, $A^t$ are indexed to match the unaligned student embeddings.

Figure 8:
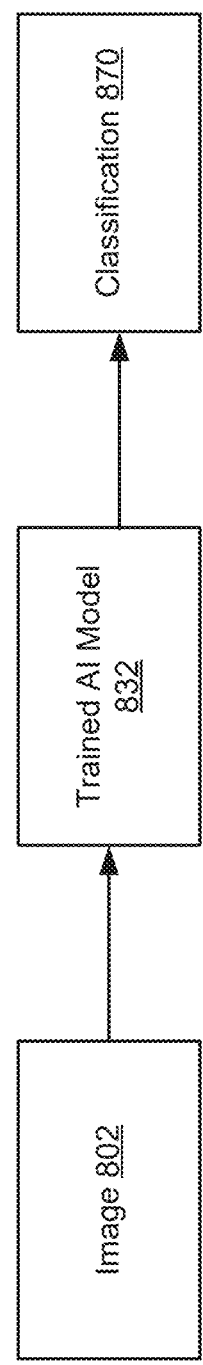
FIG. 8 illustrates an example of a trained AI model generating a classification for an image 802, according to an embodiment of the present disclosure.

FIG. 8 illustrates an example of a trained AI model 832 generating a classification 870 for an image 802, according to an embodiment of the present disclosure. The trained AI model 832 can be trained as previously described in FIGS. 2-7. The trained AI model 832 can then receive the image 802 as input and generate the classification 870 for the image 802. For example, the image 802 may be of a computer and the trained AI model 832 can generate the classification 870 to indicate that the image 802 relates to a computer.

Figure 9:
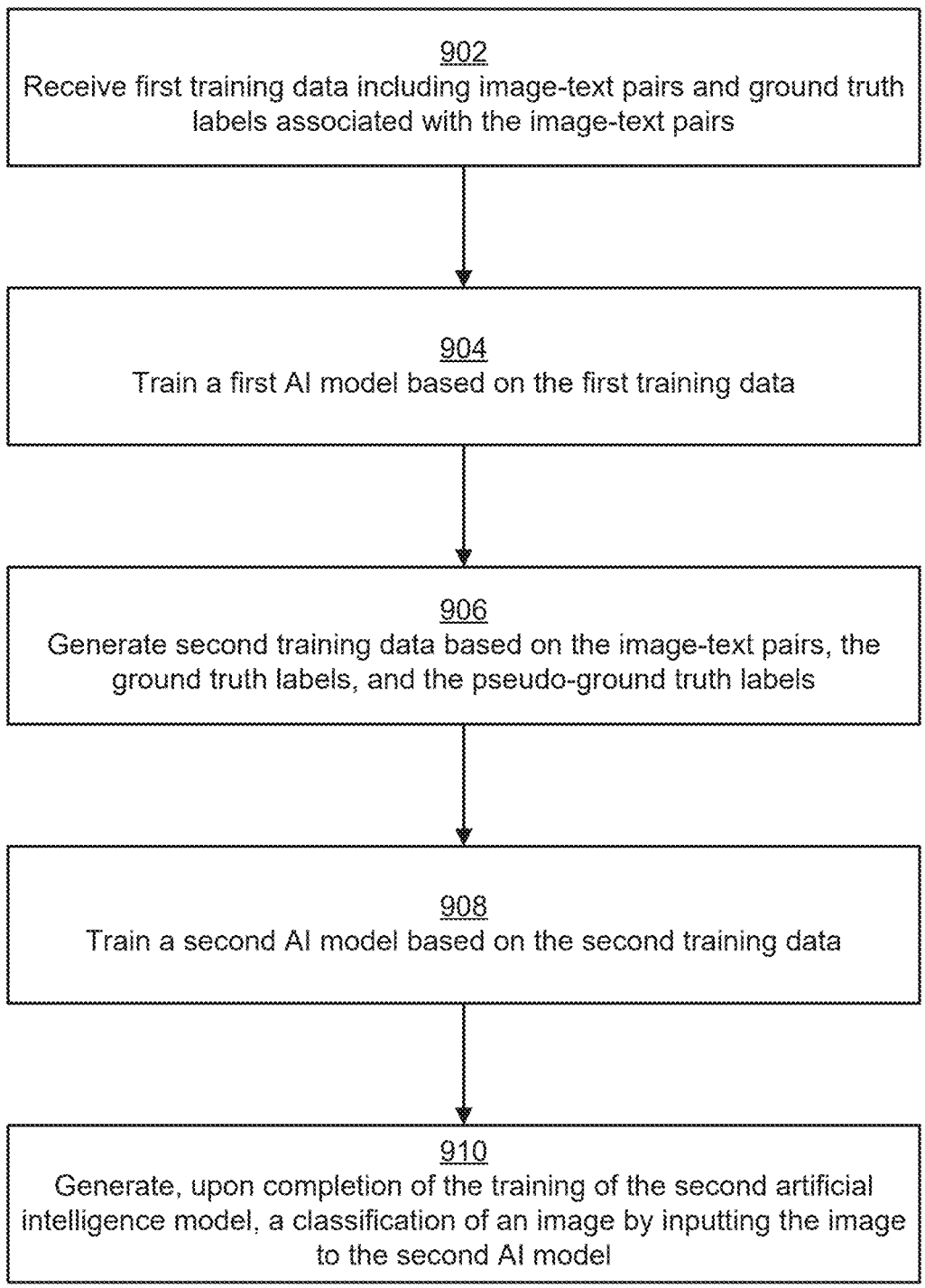
FIG. 9 illustrates an example of a flow for a process of training and using an AI model to classify images, according to an embodiment of the present disclosure.
Figure 10:
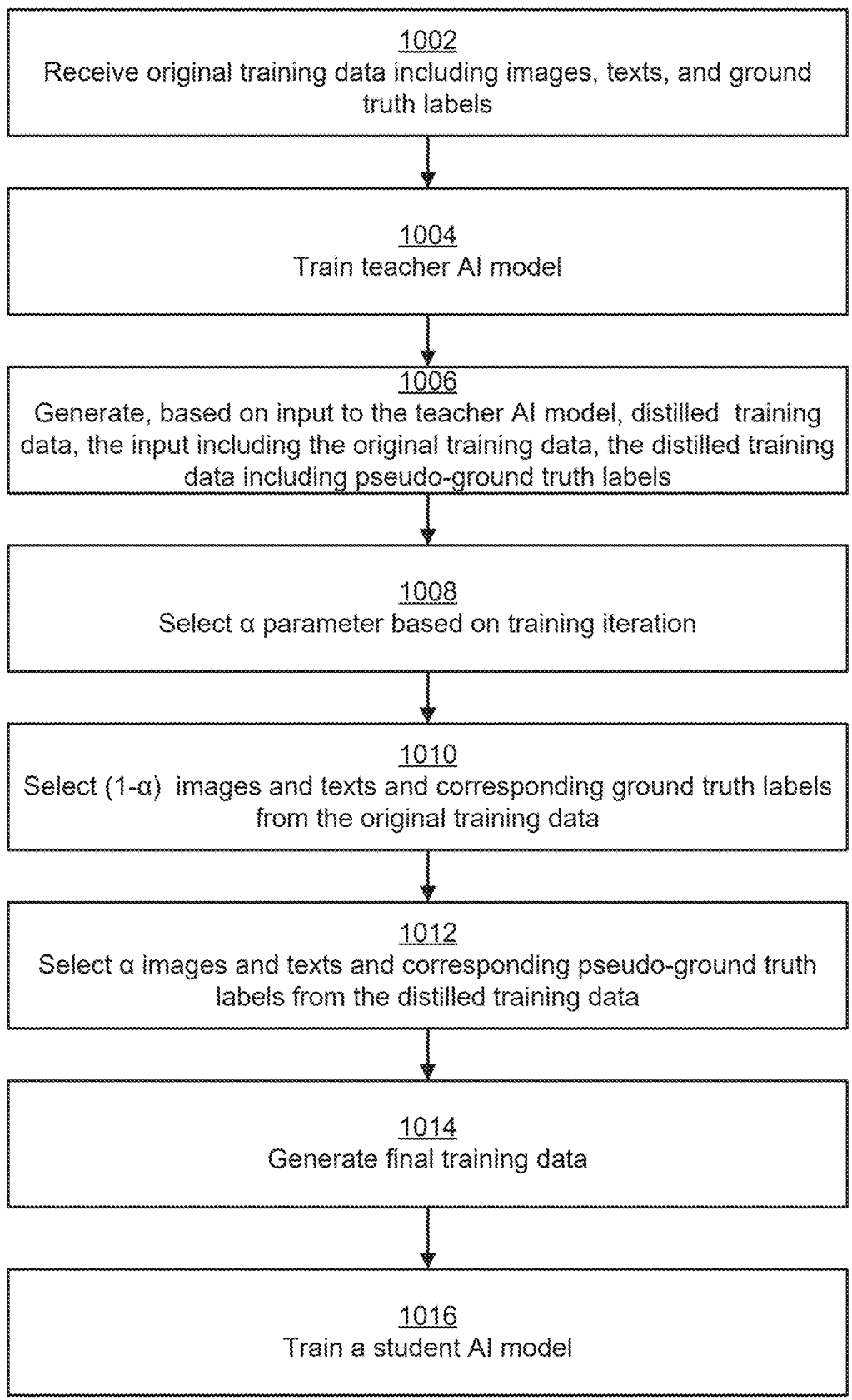
FIG. 10 illustrates an example of a flow for a process of training a teacher AI model and a student AI model to classify images, according to an embodiment of the present disclosure.

FIGS. 9 and 10 illustrate processes associated with classifying images, according to an embodiment of the present disclosure. Some or all of the processes (or any other processes described herein, or variations, and/or combinations thereof) may be performed under the control of one or more computer systems, such as the computer system 130 in FIG. 1, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 9 illustrates an example of a flow for a process of training and using an AI model to classify images, according to an embodiment of the present disclosure. In an example, the flow includes operation 902, where the computer system receives first training data including image-text pairs and ground truth labels associated with the image-text pairs. An image-text pair can include an image that shows an object and a text that describes the object. The ground truth label associated with the image-text pair can indicate a correspondence between the image and the object. The ground truth labels can be binary values and may correctly or incorrectly indicate the correspondence because the training data may be noisy.

In an example, the flow includes operation 904, where the computer system trains a first AI model based on the first training data. The first AI model can be trained to generate pseudo-ground truth labels for the image-text pairs, which indicates a likelihood of the correspondence between the image and the object. The pseudo-ground truth labels can be non-binary values.

In an example, the flow includes operation 906, where the computer system generates second training data based on the image-text pairs, the ground truth labels, and the pseudo-ground truth labels. The second training data can include a first subset of the image-text pairs and a first subset of the ground truth labels that are associated with the first subset of the image-text pairs. The second training data can further include a second subset of the image-text pairs and a second subset of the pseudo-ground truth labels that are associated with the second subset of the image-text pairs.

In an example, the flow includes operation 908, where the computer system trains a second AI model based on the second training data. The second AI model can be trained to generate classifications of images. The training of the second AI model can involve minimizing a loss function. As explained herein above, other types of training are additionally or alternatively possible including, for instance, object detection and/or text generation.

In an example, the flow includes operation 910, where the computer system generates, upon completion of the training of the second AI model, a classification of an image by inputting the image to the second AI model. For example, an image of a dog can be input to the second AI model. The second AI model can then generate a classification indicating the image includes a dog.

FIG. 10 illustrates an example of a flow for a process of training a teacher AI model and a student AI model to classify images, according to an embodiment of the present disclosure. In an example, the flow includes operation 1002, where the computer system receives original training data including images, texts, and ground truth labels. The images and texts can be in image-text pairs, and each image-text pair can be associated with a ground truth label of a binary value. For example, an image with a corresponding text can have a ground truth label of one, and an image with a non-corresponding text can have a ground truth label of zero.

In an example, the flow includes operation 1004, where the computer system trains a teacher AI model. The teacher AI model is trained, with the original training data, to determine likelihoods of image and text correspondence.

In an example, the flow includes operation 1006, where the computer system generates, based on input to the teacher AI model, distilled training data. The original training data can be the input to the teacher AI model. The teacher AI model can generate pseudo-ground truth labels that are included in the distilled training data. The pseudo-ground truth labels can be non-binary values. For example, an image of a dog and text about a dog may have a pseudo-ground truth label of 95% and an image of a dog and text about a cat may have a pseudo-ground truth label of 30%.

In an example, the flow includes operation 1008, where the computer system selects an a parameter based on the training iteration. The α parameter may be based on a predefined function or a learned function. In some instances, higher training iterations may be associated with higher a values.

In an example, the flow includes operation 1010, where the computer system selects (1−α) images, texts, and corresponding ground truth labels from the original training data.

In an example, the flow includes operation 1012, where the computer system selects α images, texts, and corresponding pseudo-ground truth labels from the distilled training data.

In an example, the flow includes operation 1014, where the computer system generates final training data. The final training data can include the (1−α) images, texts, and ground truth labels from the original training data and the α images, texts, and pseudo-ground truth labels from the distilled training data.

In an example, the flow includes operation 1016, where the computer system trains a student AI model. The final training data is used to train the student AI model to generate a classification of an image input to the student AI model. The teacher model and the student AI model may be a same contrastive model in which a same loss function is used to train the teacher AI model and the student AI model.

Figure 11:
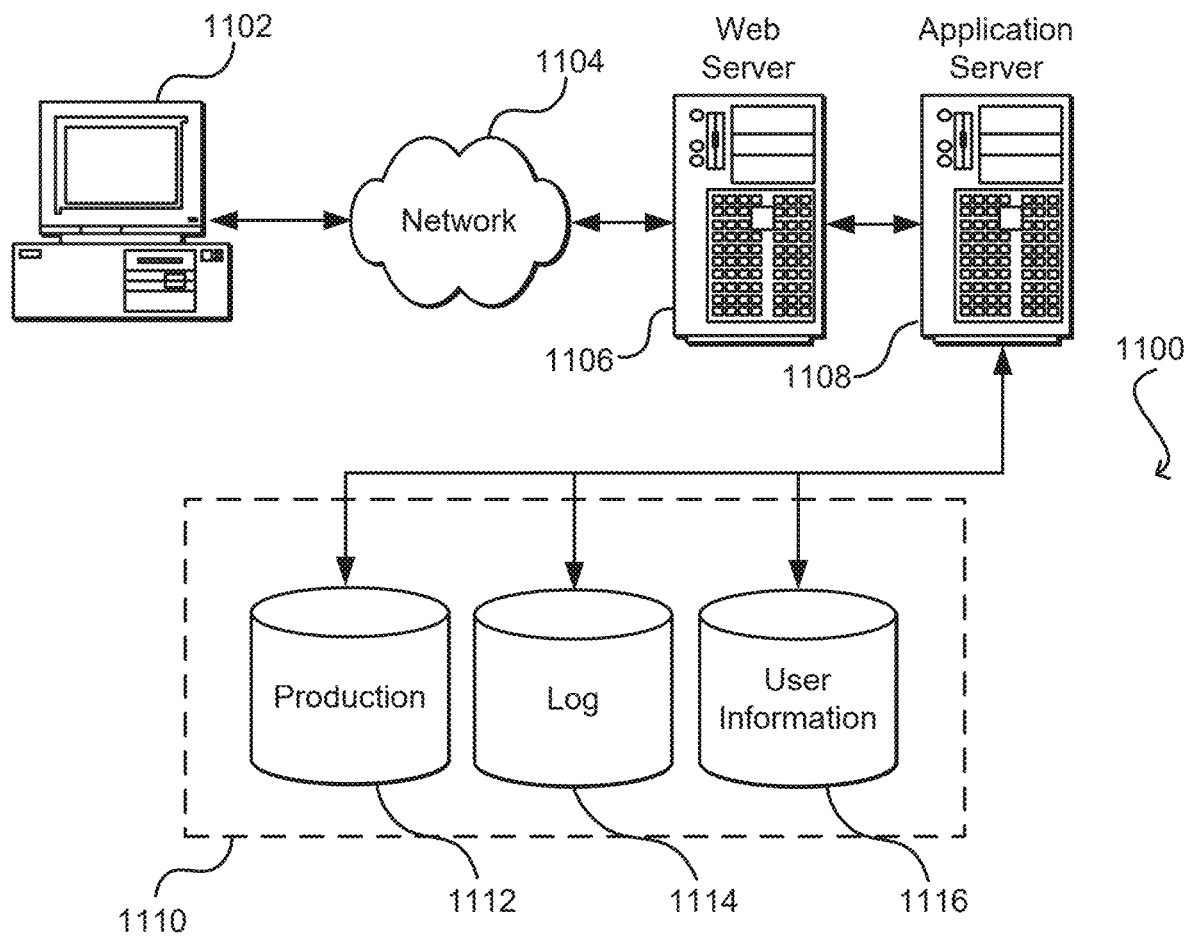
FIG. 11 illustrates aspects of an example environment for implementing aspects in accordance with various embodiments.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Computer-readable storage media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
one or more processors; and
one or more memory storing computer-readable instructions that, upon execution by the one or more processors, configure the system to:
receive first training data that comprises image-text pairs and ground truth labels associated with the image-text pairs, an image-text pair comprising an image that shows an object and a text that describes the object, a ground truth label associated with the image-text pair indicating a correspondence between the image and the object;
train a first artificial intelligence model based at least in part on the first training data, the first artificial intelligence model trained to generate pseudo-ground truth labels for the image-text pairs, a pseudo-ground truth label generated for the image-text pair indicating a likelihood of the correspondence between the image and the object;
generate second training data based at least in part on the image-text pairs, the ground truth labels, and the pseudo-ground truth labels, the second training data comprising a first subset of the image-text pairs and a first subset of the ground truth labels that are associated with the first subset of the image-text pairs, the second training data further comprising a second subset of the image-text pairs and a second subset of the pseudo-ground truth labels that are associated with the second subset of the image-text pairs;
train a second artificial intelligence model based at least in part on the second training data;
receive, an image from a user device;
generate, upon completion of the training of the second artificial intelligence model, a classification of the image by at least inputting the image to the second artificial intelligence model; and
send the classification to the user device.

2. The system of claim 1, wherein the one or more memory store further computer-readable instructions that, upon execution by the one or more processors, configure the system to:
determine a first ratio of ground truth labels and pseudo-ground truth labels to use in a first training iteration, wherein the second training data is generated further based at least in part on the first ratio;
determine a second ratio of ground truth labels and pseudo-ground truth labels to use in a second training iteration;
generate third training data based at least in part on the image-text pairs, the ground truth labels, the pseudo-ground truth labels, and the second ratio, wherein the third training data comprises a different subset of the ground truth labels and a different subset of the pseudo-ground truth labels; and
training, during the second training iteration, the second artificial intelligence model based at least in part on the third training data.

3. The system of claim 2, wherein the second training iteration is subsequent to the first training iteration, and wherein the second ratio is increased relative to the first ratio based at least in part on a predefined function.

4. The system of claim 1, wherein the first artificial intelligence model and the second artificial intelligence model are a same contrastive model, and wherein a same loss function is used in the training of the first artificial intelligence model and the second artificial intelligence model.

5. A computer-implemented method, comprising:
determining first training data that comprises a first image, first text, a second image, second text, a first indication of a first correspondence between the first image and the first text, and a second indication of a second correspondence between the second image and the second text, wherein the first image and the first text form a first image-text pair with which a first ground truth label is associated, wherein the first ground truth label indicates the first correspondence;
training a first artificial intelligence model based at least in part on the first image-text pair and the first ground truth label, wherein the first artificial intelligence model is trained to generate a pseudo-ground truth label that indicates a likelihood of the first image and the first text corresponding to each other;
generating second training data that comprises the first image, the first text, the second image, the second text, the pseudo-ground truth label, and the second indication; and
training a second artificial intelligence model based at least in part on the second training data and the pseudo-ground truth label.

6. The computer-implemented method of claim 5, the computer-implemented method further comprises:
generating, upon completion of the training of the second artificial intelligence model, a classification of an image by at least inputting the image to the second artificial intelligence model.

7. The computer-implemented method of claim 5, wherein the first indication comprises a ground truth label having a binary value that indicates the first correspondence, and wherein the likelihood represents a pseudo-ground truth label having a non-binary value indicating a prediction that the first image and the first text correspond to each other.

8. The computer-implemented method of claim 5, further comprising:
determining a first number of ground truth labels to use from the first training data, wherein the ground truth labels are associated with first image-text pairs from the first training data and each indicates an image and text correspondence;
determining a second number of pseudo-ground truth labels to use, wherein the pseudo-ground truth labels are associated with second image-text pairs from the first training data and each indicates an image and text correspondence likelihood; and
generating second training data that includes the first image-text pairs, the second image-text pairs, the first number of ground truth labels, and the second number of pseudo-ground truth labels, wherein the second artificial intelligence model is trained based at least in part on the second training data instead of the first training data.

9. The computer-implemented method of claim 8, wherein the first number and the second number are determined for a first training iteration, and wherein the computer-implemented method further comprises,
determining, for a second training iteration, an updated first number of ground truth labels and an updated second number of pseudo-ground truth labels, wherein the second artificial intelligence model is further trained based at least in part on the updated first number of ground truth labels and the updated second number of pseudo-ground truth labels.

10. The computer-implemented method of claim 9, wherein the updated second number is determined based at least in part on an increase to the second number, and wherein the updated first number is determined based at least in part on a decrease to the first number.

11. The computer-implemented method of claim 5, further comprising:
   training, at a first time and based at least in part on the first training data, the first artificial intelligence model to generate likelihoods;
   generating, after the training at the first time, the likelihood based at least in part on an input to the first artificial intelligence model, the input comprising the first image, the second image, the first text, and the second text, and wherein the second artificial intelligence model is trained at a second time based at least in part on the second training data.

12. The computer-implemented method of claim 5, wherein the second artificial intelligence model is trained to learn text-to-image representations and image-to-text representations based at least in part on a ratio of ground truth labels and pseudo-ground truth labels, and wherein the ratio changes between training iterations.

13. The computer-implemented method of claim 12, wherein the second artificial intelligence model is trained using a loss function that comprises a loss function associated with learning the text-to-image representations and a second loss function associated with learning the image-to-text representations.

14. One or more non-transitory computer-readable storage media storing instructions that, upon execution on a system, cause the system to perform operations comprising:
   determining first training data that comprises a first image, first text, a second image, second text, a first indication of a first correspondence between the first image and the first text, and a second indication of a second correspondence between the second image and the second text, wherein the first image and the first text form a first image-text pair with which a first ground truth label is associated, wherein the first ground truth label indicates the first correspondence;
   training a first artificial intelligence model based at least in part on the first image-text pair and the first ground truth label, wherein the first artificial intelligence model is trained to generate a pseudo-ground truth label that indicates a likelihood of the first image and the first text corresponding to each other;
   generating second training data that comprises the first image, the first text, the second image, the second text, the pseudo-ground truth label, and the second indication; and
   training a second artificial intelligence model based at least in part on the second training data and on the pseudo-ground truth label.

15. The one or more non-transitory computer-readable storage media of claim 14, wherein the operations further comprise:
   training, at a first time and based at least in part on the first training data, the first artificial intelligence model to generate likelihoods;
   generating, after the training at the first time, the likelihood based at least in part on an input to the first artificial intelligence model, the input comprising images and texts from the first training data, and wherein the second artificial intelligence model is trained at a second time based at least in part on the second training data, wherein the second training data comprises the images and the texts.

16. The one or more non-transitory computer-readable storage media of claim 15, the operations further comprise:
   generating, after the training at the first time, the likelihood based at least in part on an input to the first artificial intelligence model, the input comprising images and texts from the first training data, and wherein the second artificial intelligence model is trained at a second time based at least in part on the second training data, wherein the second training data comprises different images and different texts from the first training data.

17. The one or more non-transitory computer-readable storage media of claim 14, wherein the second artificial intelligence model is trained in a plurality of training iterations, wherein a number of pseudo-ground truth labels changes across the training iterations, wherein each pseudo-ground truth label indicates a likelihood of image and text correspondence.

18. The one or more non-transitory computer-readable storage media of claim 17, wherein the number of pseudo-ground truth labels increases between a decoding iteration and a subsequent decoding iteration.

19. The one or more non-transitory computer-readable storage media of claim 17, wherein the number of pseudo-ground truth labels increases between a decoding iteration and a subsequent decoding iteration based at least in part on a predefined function.

20. The one or more non-transitory computer-readable storage media of claim 17, wherein the number of pseudo-ground truth labels increases between a decoding iteration and a subsequent decoding iteration, and wherein a value to use for increasing the number of pseudo-ground truth labels is learning during the training.

* * * * *